United States Patent
Jakobs et al.

(10) Patent No.: US 11,845,394 B2
(45) Date of Patent: Dec. 19, 2023

(54) LEG PROTECTION DEVICE FOR AN OCCUPANT PROTECTION SYSTEM OF A VEHICLE

(71) Applicants: Audi AG, Ingolstadt (DE); ZF Automotive Germany GmbH, Alfdorf (DE)

(72) Inventors: Bernd Jakobs, Nuremberg (DE); Franz Fürst, Buxheim (DE); Walter Krönes, Gaimersheim (DE); Christoph Grundheber, Gaimersheim (DE)

(73) Assignees: AUDI AG, Ingolstadt (DE); ZF Automotive Germany GmbH, Aldorf (DE)

( * ) Notice: Subject to any disclaimer, the term of this patent is extended or adjusted under 35 U.S.C. 154(b) by 0 days.

(21) Appl. No.: 17/618,181

(22) PCT Filed: May 26, 2020

(86) PCT No.: PCT/EP2020/064511
§ 371 (c)(1),
(2) Date: Dec. 10, 2021

(87) PCT Pub. No.: WO2020/249390
PCT Pub. Date: Dec. 17, 2020

(65) Prior Publication Data
US 2022/0266786 A1   Aug. 25, 2022

(30) Foreign Application Priority Data
Jun. 11, 2019   (DE) .................. 10 2019 208 417.6

(51) Int. Cl.
*B60R 21/233*  (2006.01)
*B60R 21/013*  (2006.01)
(Continued)

(52) U.S. Cl.
CPC .......... *B60R 21/233* (2013.01); *B60R 21/013* (2013.01); *B60R 21/206* (2013.01);
(Continued)

(58) Field of Classification Search
CPC ... B60R 21/013; B60R 21/206; B60R 21/233; B60R 21/239; B60R 2021/0046;
(Continued)

(56) References Cited

U.S. PATENT DOCUMENTS 6,685,217 B2   2/2004  Abe
6,916,039 B2 *  7/2005  Abe ...................... B60R 21/233
                                                        280/752
(Continued)

FOREIGN PATENT DOCUMENTS

CN   1911711 A    2/2007
CN   101678808 A  3/2010
(Continued)

OTHER PUBLICATIONS

International Search Report of the International Searching Authority directed to related International Patent Application No. PCT/EP2020/064511, dated Jul. 6, 2020, with attached English-language translation; 7 pages.
(Continued)

*Primary Examiner* — Laura Freedman
(74) *Attorney, Agent, or Firm* — Sterne, Kessler, Goldstein Fox P.L.L.C.

(57) ABSTRACT

The present disclosure relates to a leg protection device for an occupant protection system of a vehicle. The leg protection device includes an airbag module. The airbag module includes an airbag and a gas generator that inflates the airbag to a deployed state such that the airbag is disposed in the footwell and in front of a vehicle seat. The airbag includes a first chamber and a second chamber fluidically connected
(Continued)

to the first chamber. The first chamber and the second chamber are deployed in the footwell to protect an occupant when the airbag is set in the deployed state. The first chamber is connected to the second chamber by a flexible connection region that diverts the airbag along the object in any spatial direction when the airbag encounters the object during deployment in the footwell.

7 Claims, 3 Drawing Sheets

(51) Int. Cl.
 B60R 21/206 (2011.01)
 B60R 21/239 (2006.01)
 B60R 21/00 (2006.01)
 B60R 21/231 (2011.01)

(52) U.S. Cl.
 CPC .... *B60R 21/239* (2013.01); *B60R 2021/0046* (2013.01); *B60R 2021/0053* (2013.01); *B60R 2021/23169* (2013.01); *B60R 2021/23176* (2013.01); *B60R 2021/23316* (2013.01)

(58) Field of Classification Search
 CPC .... B60R 2021/0051; B60R 2021/0053; B60R 2021/23169; B60R 2021/23176; B60R 2021/23308; B60R 2021/23316; B60R 2021/23382; B60R 21/01554; B60R 2021/01231; B60R 2021/23107
 See application file for complete search history.

(56) References Cited

U.S. PATENT DOCUMENTS

| | | | | |
|---|---|---|---|---|
| 7,201,395 | B2* | 4/2007 | Nagata | B60R 21/2171 280/752 |
| 7,314,230 | B2* | 1/2008 | Kumagai | B60R 21/233 280/743.2 |
| 7,434,837 | B2* | 10/2008 | Hotta | B60R 21/233 280/743.2 |
| 7,455,318 | B2* | 11/2008 | Kuriyama | B60R 21/206 280/735 |
| 8,220,828 | B2 | 7/2012 | Fukawatase et al. | |
| 8,272,667 | B2* | 9/2012 | Schneider | B60R 21/233 280/729 |
| 8,292,323 | B2* | 10/2012 | Matsushima | B60R 21/2338 280/743.2 |
| 8,376,396 | B2* | 2/2013 | Miller | B60R 21/206 280/736 |
| 8,393,636 | B2* | 3/2013 | Tanaka | B60R 21/261 280/743.1 |
| 8,505,969 | B2 | 8/2013 | Mendez | |
| 9,283,911 | B2 | 3/2016 | Nagasawa | |
| 10,086,788 | B2* | 10/2018 | Ando | B60R 21/231 |
| 10,093,265 | B2* | 10/2018 | Ando | B60R 21/231 |
| 10,457,243 | B2 | 10/2019 | Munsee et al. | |
| 10,525,924 | B2* | 1/2020 | Abe | B60R 21/26 |
| 10,821,931 | B2 | 11/2020 | Elija et al. | |
| 11,305,717 | B2* | 4/2022 | Shrivatri | B60R 21/2338 |
| 2002/0149187 | A1 | 10/2002 | Holtz et al. | |
| 2015/0197210 | A1 | 7/2015 | Abe | |
| 2017/0232920 | A1 | 8/2017 | Abe et al. | |
| 2019/0039549 | A1 | 2/2019 | O'Connor et al. | |

FOREIGN PATENT DOCUMENTS

| | | |
|---|---|---|
| CN | 203902473 U | 10/2014 |
| CN | 105128807 A | 12/2015 |
| CN | 104742849 B | 8/2017 |
| CN | 108698553 A | 10/2018 |
| CN | 108973926 A | 12/2018 |
| DE | 19946477 A1 | 3/2001 |
| DE | 60207932 T2 | 8/2006 |
| DE | 60307582 T2 | 9/2007 |
| DE | 102010042943 A1 | 5/2011 |
| DE | 102011053863 A1 | 3/2013 |
| DE | 102014216472 A1 | 3/2015 |
| EP | 1354771 A1 | 10/2003 |
| EP | 1431132 A1 | 6/2004 |
| JP | 2013208923 A | 10/2013 |
| WO | WO 2017/140521 A1 | 8/2017 |

OTHER PUBLICATIONS

International Preliminary Report on Patentability directed to related International Patent Application No. PCT/EP2020/064511, dated Dec. 14, 2021, with attached English-language translation; 15 pages.

* cited by examiner

LEG PROTECTION DEVICE FOR AN OCCUPANT PROTECTION SYSTEM OF A VEHICLE

TECHNICAL FIELD

The present invention relates to a leg protection device for an occupant protection system of a vehicle in accordance with the preamble of claim 1. The present invention further relates to a vehicle with a leg protection device of this kind.

BACKGROUND

Occupant protection systems for vehicles are known in numerous variations. Airbags and seat belts are used to provide adequate protection for the occupant in an upright sitting position in the event of a collision. In vehicles with piloted driving functions, comfort positions are provided for the occupants which, as a rule, allow an adjustment of the backrest in the horizontal direction and/or an adjustment of the longitudinal seat adjustment to the rear in the longitudinal direction of the vehicle. Under specific circumstances, the lower legs may "swing up" in the event of an impact. This can result in increased loads in the leg region, which can at least be reduced or prevented by a leg protection device which comprises at least one airbag.

DE 10 2010 042 943 A1 discloses a knee airbag module for protecting a vehicle occupant with a housing which accommodates an inflatable airbag and an inflation device for providing gas for inflating the airbag. In this case, the airbag is designed by suitable means so that the airbag is inflated and deployed out of the housing into a position in front of the knees of the occupant, the airbag containing a front side and a rear side which are connected to one another to form at least one inflatable chamber. Once the airbag is deployed, the front side is positioned adjacent to an instrument panel of the vehicle and the rear side is positioned adjacent to the occupant. In addition, the vertical cross-sectional length of the front side is shorter than the vertical cross-sectional length of the rear side, thereby causing the airbag to deploy upward in a predetermined direction.

From DE 10 2014 216 472 A1, an occupant protection device is known. In this case, a control part determines the positions of the lower legs of an occupant seated in a seat based on detection signals from sensor modules and controls the deployment states of airbag modules for lower legs according to the specified positions of the lower legs in order to support the lower legs of the occupant at the specified positions of the lower legs using the deployed airbag modules.

From DE 602 07 932 T2, a generic leg protection device is known which comprises an airbag and a gas generator for inflating the airbag in order to protect the legs of the vehicle occupant from a collision with an interior trim in the event of a vehicle collision. In this case, the airbag comprises a plurality of chambers which are designed to deploy in a predetermined direction.

It can be seen as a disadvantage that the different sizes of people and/or sitting positions can result in different requirements for the design of the airbag.

SUMMARY OF INVENTION

The invention is based on the object of providing a leg protection device for an occupant protection system of a vehicle and a corresponding vehicle with a leg protection device of this kind, in which the leg protection device automatically adapts to different sizes of people and/or sitting positions.

This object is achieved by a leg protection device for an occupant protection system of a vehicle with the features of the claimed invention and by a method with the features of the claimed invention. Advantageous configurations with expedient further developments of the invention are specified by other claimed embodiments.

In order to provide a leg protection device for an occupant protection system of a vehicle which automatically adapts to different sizes of people and/or sitting positions, at least two chambers of an airbag are connected to one another by a flexible connection region. In this case, during the deployment in the footwell when the airbag encounters an object, the flexible connection region causes a diversion of the airbag along the object in any spatial direction, so that the airbag is adapted to the position and location of the object in the deployed state.

Furthermore, the leg protection device comprises an airbag module which comprises the airbag and a gas generator for inflating the airbag and is arranged in the footwell in front of a vehicle seat. In this case, the airbag comprises at least two chambers which are fluidically connected to one another and can be deployed in the footwell to protect the occupant. The object in the footwell is, for example, a leg or a foot of the occupant.

In addition, a vehicle with an occupant protection system is proposed which comprises at least one leg protection device of this kind and a crash sensor system. In this case, the leg protection device can be triggered when the crash sensor system detects an impending impact or an impact that has occurred.

Due to the flexible connection region between the at least two chambers of the airbag, the airbag is advantageously able to adapt to different foot, leg, and sitting positions of the occupant individually without additional sensors. The advantage is that occupants of different body sizes can be protected as best as possible in every sitting position, in particular in a comfort position. Furthermore, different load cases can also be addressed individually. The technical implementation can take place, for example, via a targeted overflow solution as well as via an adapted design of the chambers of the airbag.

In an advantageous manner, the occupant can be protected in upright sitting positions as well as in comfort positions by the airbag which is always the same but which automatically adapts to the respective free space conditions. Thanks to the chambers that are flexibly connected to one another, the airbag can individually protect different leg and foot positions.

In an advantageous embodiment of the leg protection device according to an embodiment of the invention, the flexible connection region can comprise at least one separation seam. In this case, at least one overflow opening can be introduced into the at least one separation seam. This allows a simple and inexpensive implementation of the desired overflow behavior, which facilitates the diversion of the airbag along the object in any spatial direction.

In a further advantageous embodiment of the leg protection device according to an embodiment of the invention, the flexible connection region can comprise an overflow channel which is formed between two separation seams. In addition, the two separation seams can each have an overflow opening, which is formed at opposite end regions of the two separation seams. This results in a meandering structure for implementing the desired overflow behavior for simple diversion of the airbag.

In a further advantageous embodiment of the leg protection device according to an embodiment of the invention, the at least two chambers can have at least one ventilation hole, which can be designed to be active or passive or as an overflow function. As a result, the deployment behavior and the overflow behavior of the individual chambers of the airbag can be adapted to different installation spaces or footwells.

In a further advantageous embodiment of the leg protection device according to an embodiment of the invention, the at least two chambers can have identical shapes and receiving volumes. Alternatively, the at least two chambers can have different shapes and receiving volumes.

In an advantageous embodiment of the vehicle according to an embodiment of the invention, the airbag module of the leg protection device can be arranged in the lower region of an instrument panel.

The advantages and preferred embodiments described for the leg protection device according to an embodiment of the invention also apply to the vehicle according to embodiments of the invention.

The features and feature combinations mentioned above in the description, as well as the features and feature combinations mentioned below in the description of the figures and/or shown only in the figures, can be used not only in the respectively specified combination but also in other combinations or in isolation without getting out of the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

Embodiments of the invention are shown in the drawing and are explained in more detail in the following description. In the drawing, the same reference signs designate components or elements that perform the same or analogous functions. In the drawing.

DETAILED DESCRIPTION OF THE FIGURES

Figure 1:
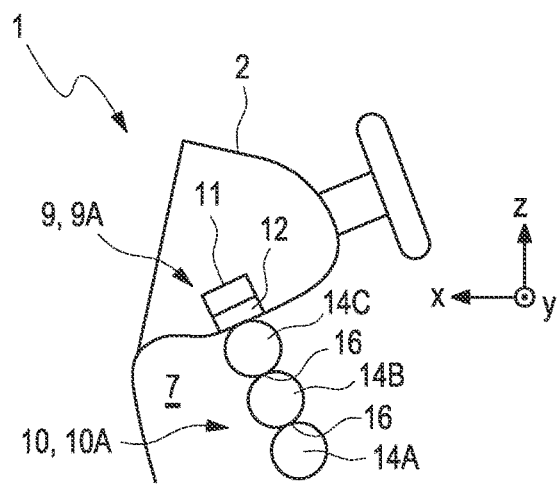
FIG. 1 is a schematic representation of a first embodiment of a leg protection device according to an embodiment of the invention for an occupant protection system of a vehicle.

As can be seen from FIGS. 1 to 9, the leg protection device 9, 9A, 9B, 9C for an occupant protection system of a vehicle 1 in the illustrated embodiments each has an airbag module 11, which comprises an airbag 10, 10A, 10B, 10C and a gas generator 12 for inflating the airbag 10, 10A, 10B, 10C and is arranged in the footwell 7 in front of a vehicle seat 5. The airbag 10, 10A, 10B, 10C comprises at least two chambers 14A, 14B, 14C which are fluidically connected to one another and can be deployed in the footwell 7 to protect the occupant 3.

According to an embodiment of the invention, the at least two chambers 14A, 14B, 14C are connected to one another by a flexible connection region 16, which, during the deployment in the footwell 7 when the airbag encounters an object 4, causes a diversion of the airbag 10, 10A, 10B, 10C along the object 4 in any spatial direction, so that the airbag 10, 10A, 10B, 10C is adapted to the position and location of the object 4 in the deployed state.

Figure 2:
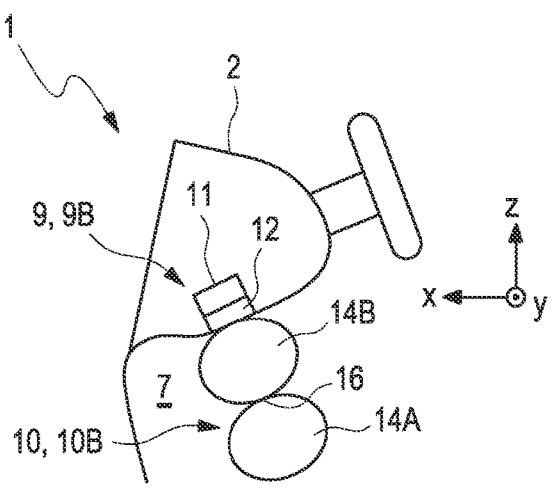
FIG. 2 is a schematic representation of a second embodiment of a leg protection device according to an embodiment of the invention for an occupant protection system of a vehicle.

As can also be seen from FIGS. 1 and 2, the at least two chambers 14A, 14B, 14C of the airbag 10A, 10B in the illustrated embodiments of the leg protection device 9A have identical shapes and receiving volumes.

As can also be seen from FIG. 1, the airbag 10A in the illustrated first embodiment of the leg protection device 9A has three identical chambers 14A, 14B, 14C which are deployed into the footwell 7 without the object 4.

As can also be seen from FIG. 2, the airbag 10B in the illustrated second embodiment of the leg protection device 9B has only two chambers 14A, 14B which are deployed into the footwell 7 without the object 4. The two chambers 14A, 14B are each larger than the individual chambers 14A, 14B, 14C in the first embodiment from FIG. 1.

Figure 3:
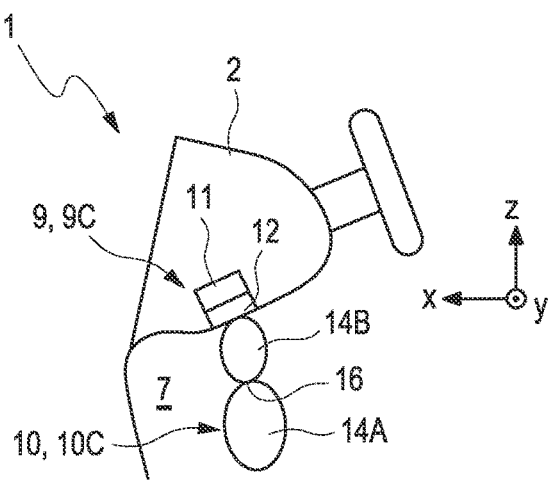
FIG. 3 is a schematic representation of a third embodiment of a leg protection device according to an embodiment of the invention for an occupant protection system of a vehicle.

As can also be seen from FIG. 3, the airbag 10C in the illustrated third embodiment of the leg protection device 9C has two chambers 14A, 14B which have different shapes and receiving volumes and are deployed into the footwell 7 without the object 4. Of course, in the embodiments not shown, the airbag 10 can also have more than three identical chambers 14A, 14B, 14C or also more than two different chambers 14A, 14B.

Figure 4:
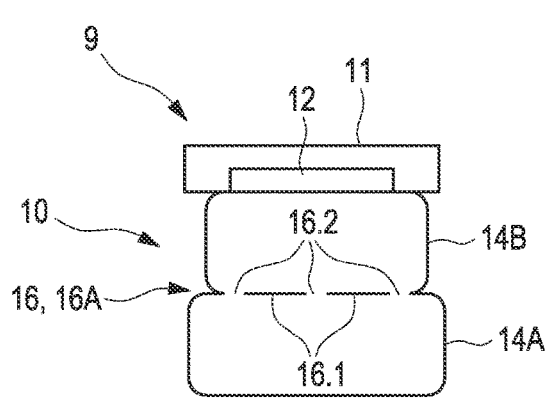
FIG. 4 is a schematic representation of a first embodiment of an airbag of the leg protection device according to an embodiment of the invention from FIGS. 1 to 3.
Figure 5:
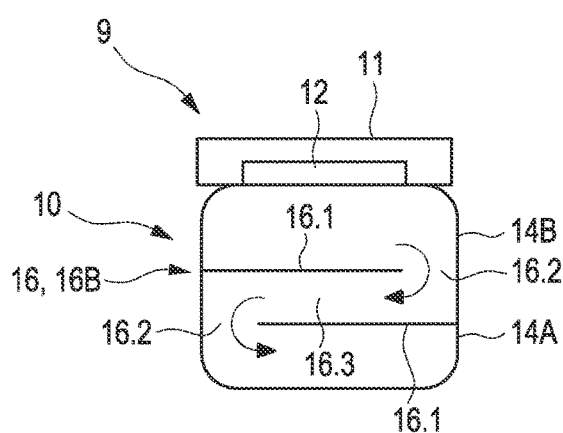
FIG. 5 is a schematic representation of a second embodiment of an airbag of the leg protection device according to an embodiment of the invention from FIGS. 1 to 3.

As can also be seen from FIGS. 4 and 5, the flexible connection region 16A, 16B of the illustrated airbag 10 each comprises at least one separation seam 16.1. In this case, at least one overflow opening 16.2 is introduced into the at least one separation seam 16.1. In addition, the at least two chambers 14A, 14B, 14C can have at least one ventilation hole (not shown) which can be designed to be active or passive or as an overflow function.

As can also be seen from FIG. 4, the flexible connection region 16A in the illustrated embodiment of the airbag 10 comprises a separation seam 16.1, into which a plurality of overflow channels 16.2 are introduced.

As can also be seen from FIG. 5, the flexible connection region 16B in the illustrated embodiment comprises an overflow channel 16.3, which is formed between two separation seams 16.1. In addition, the two separation seams 16.1 each have an overflow opening 16.2, which are formed at opposite end regions of the two separation seams 16.1. As a result, the overflow channel 16.3 is designed as a meander in the illustrated embodiment. Of course, the flexible connection region 16 can also have other suitable shapes.

FIGS. 6 to 9 show examples of different protective positions and protective effects of the airbag 10 with different seat, foot, and leg positions. As can also be seen from FIGS. 6 to 9, the occupant protection system of the illustrated vehicle 1 comprises, for example, the leg protection device 9C according to an embodiment of the invention illustrated in FIG. 3 and a steering wheel airbag 8. Furthermore, the occupant protection system of the vehicle 1 includes a crash sensor system (not shown in more detail). In this case, the leg protection device 9C and the steering wheel airbag are triggered when the crash sensor system detects an impending impact or an impact that has occurred. In addition, the vehicle 1 comprises an instrument panel 2 and an adjustable vehicle seat 5, the airbag module 11 of the leg protection device 9C being arranged in the lower region of the instrument panel 2. In the illustrated vehicle 1, the object 4 in the footwell 7 is a leg 4A or a foot 4B of the occupant 3 in the illustrated embodiments.

Figure 6:
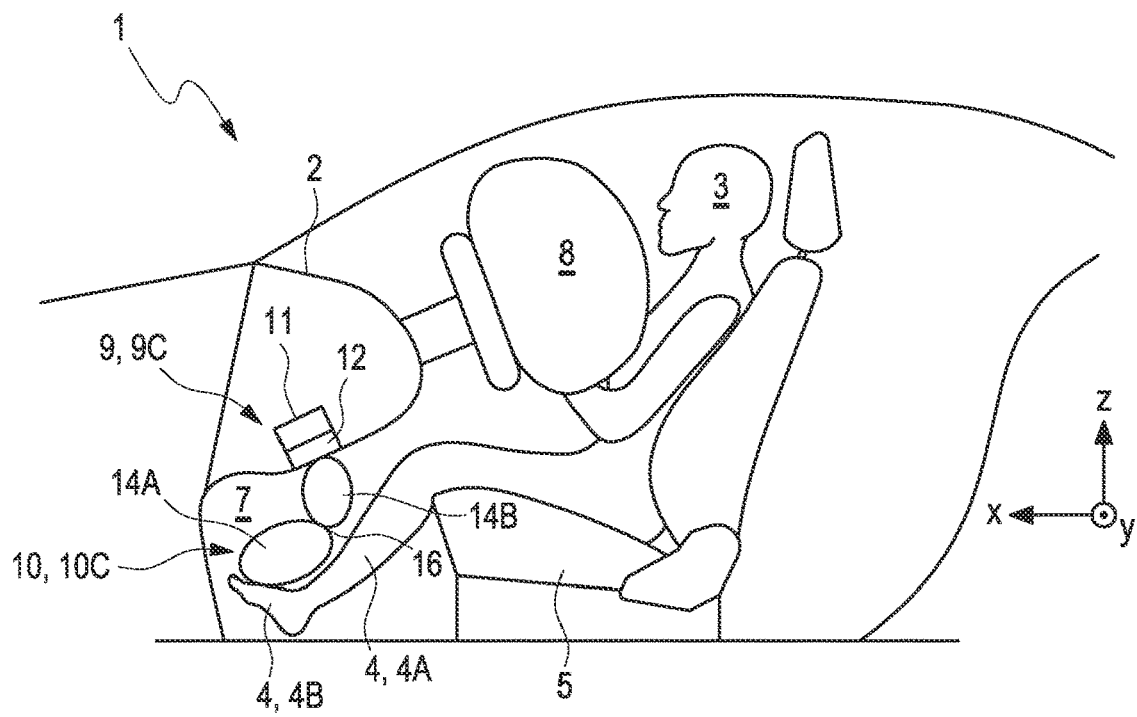
FIGS. 6 to 9 are in each case a schematic representation of a vehicle with the leg protection device according to an embodiment of the invention from FIG. 3 in different protective positions.

As can also be seen from FIG. 6, the illustrated vehicle seat 5 has a normal position in the illustrated protective position, so that both the leg protection device 9C and the steering wheel airbag 8 are activated in the event of an impact. As can also be seen from FIG. 6, the first chamber 14A of the airbag 10C has deployed through the flexible connection region 16 along a lower portion of the leg 4A and an upper side of the raised foot 4B in the positive longitudinal direction x of the vehicle and is arranged between the instrument panel 2 and the leg 4A or foot 4B of the occupant 3. The second chamber 14B has deployed without diversion in the direction of the footwell 7.

Figure 7:
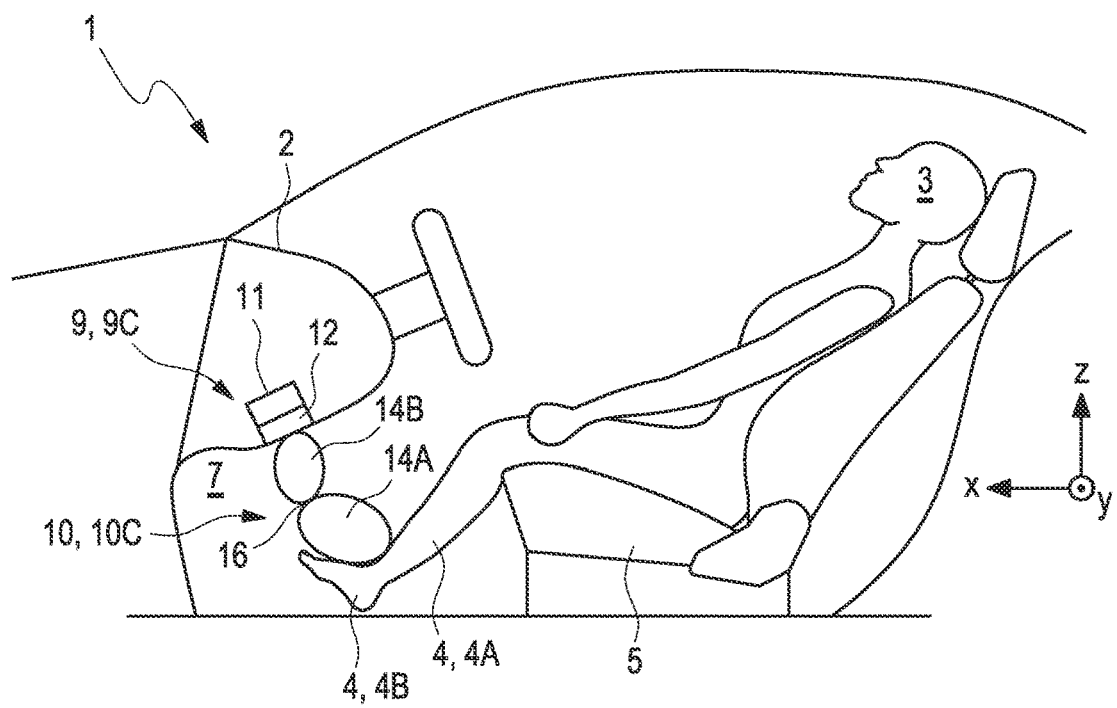
Figure 8:
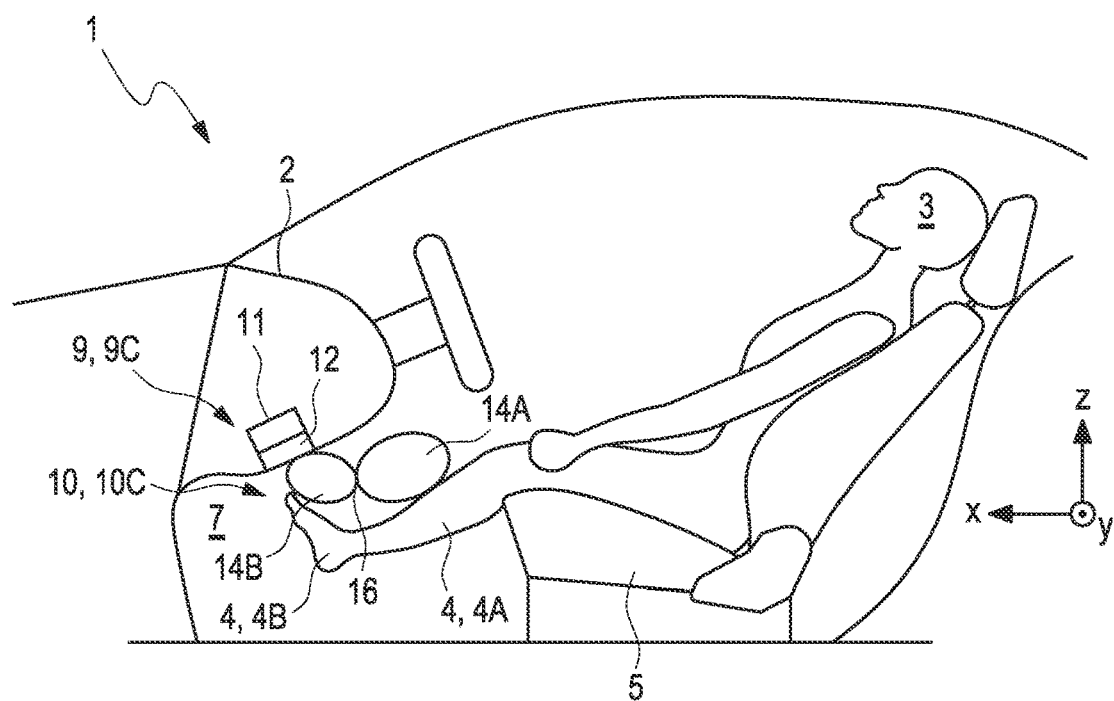
Figure 9:
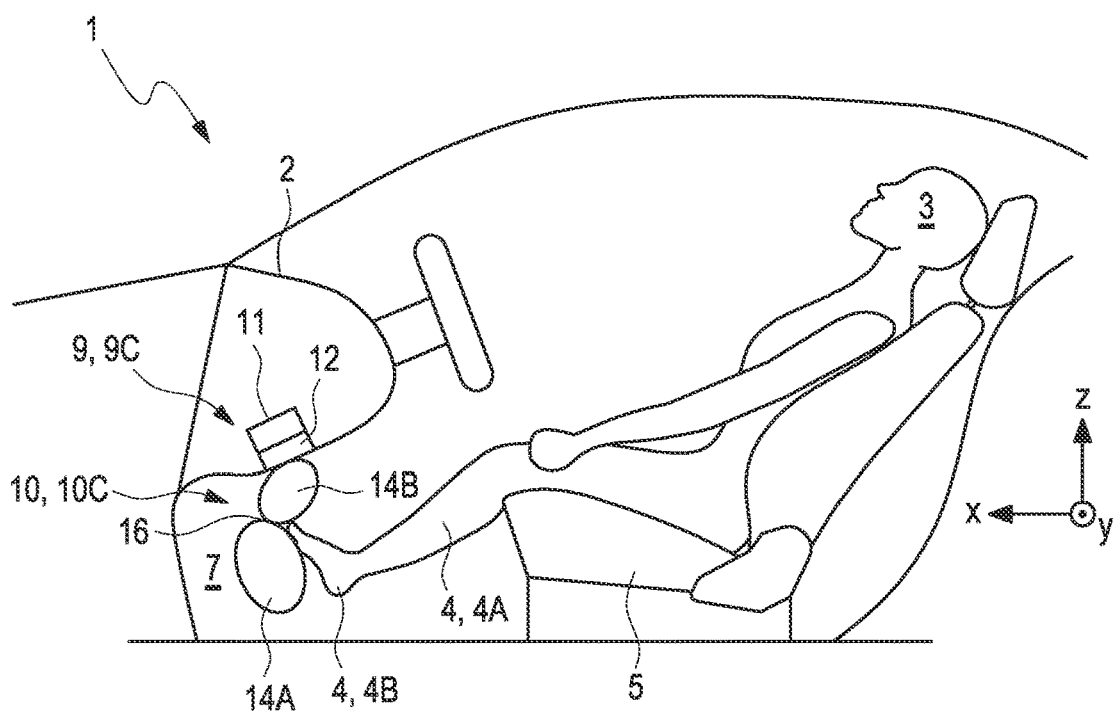

As can also be seen from FIGS. 7 to 9, the illustrated vehicle seat 5 in the illustrated protective positions each has a comfort position with an inclined backrest and the vehicle seat 5 displaced backwards in the longitudinal direction of the vehicle, so that only the leg protection device 9C is activated in this case in the event of an impact, wherein the vehicle seat 5 in FIG. 8 is shifted to its end position to the rear and in FIGS. 7 and 9 is shifted to an intermediate position to the rear.

As can also be seen from FIG. 7, the first chamber 14A of the airbag 10C has deployed through the flexible connection region 16 along the upper side of the raised foot 4B and the lower portion of the leg 4A in the negative longitudinal direction x of the vehicle and is arranged between the instrument panel 2 and the leg 4A or foot 4B of the occupant 3. Analogously to the protective position shown in FIG. 6, the second chamber 14B has deployed without diversion in the direction of the footwell 7.

As can also be seen from FIG. 8, the first chamber 14A of the airbag 10C has deployed through the flexible connection region 16 along the upper side of the raised foot 4B and the lower portion of the leg 4A in the negative longitudinal direction x of the vehicle and is arranged between the instrument panel 2 and the leg 4A or foot 4B of the occupant 3. In addition, the second chamber 14B was deflected and deployed in the negative longitudinal direction x of the vehicle by the upper side of the raised foot 4B.

As can also be seen from FIG. 9, the first chamber 14A of the airbag 10C has initially deployed through the flexible connection region 16 along the upper side of the raised foot 4B in the longitudinal direction x of the vehicle. In addition, the second chamber 14B was deployed in the longitudinal direction x of the vehicle by the upper side of the raised foot 4B. Therefore, the first chamber 14A is arranged between a vehicle floor or an engine compartment partition and an underside of the foot 4B, and the second chamber 14B is arranged between the instrument panel 2 and the foot 4B of the occupant 3.

The illustrated protective positions of the airbag 10 are only to be seen by way of example, since the airbag can individually protect different leg and foot positions due to the chambers 14A, 14B, 14C that are flexibly connected to one another. Of course, other protective positions (not shown) are also possible due to the flexible connection region 16. Two, three, four, or n-chamber systems with the same or different chamber volumes can be implemented. In this case, the expression can be designed in such a way that a plurality of small chambers 14A, 14B, 14C can be located individually in the footwell 7.

LIST OF REFERENCE SIGNS

1 Vehicle
2 Instrument panel
3 Occupant
4 Object
4A Leg
4B Foot
5 Vehicle seat
7 Footwell
8 Steering wheel airbag
9, 9A, 9B, 9C Leg protection device
10, 10A, 10B, 10C Airbag
11 Airbag module
12 Gas generator
14A, 14B, 14C Airbag chamber
16, 16A, 16B Connection region
16.1 Separation seam
16.2 Overflow opening
16.3 Connection channel
x Longitudinal direction of the vehicle
y Transverse direction of the vehicle
z Vertical direction of the vehicle

The invention claimed is:

1. A leg protection device for an occupant protection system of a vehicle, comprising:
   an airbag module comprising an airbag and a gas generator configured to inflate the airbag to a deployed state, wherein the airbag is disposed in a footwell of the vehicle and in front of a vehicle seat when set in the deployed state,
   wherein the airbag comprises a first chamber and a second chamber fluidically connected to the first chamber, and the first chamber and the second chamber are each configured to be deployed in the footwell to protect an occupant of the vehicle when the airbag is set in the deployed state,
   wherein the first chamber is connected to the second chamber by a flexible connection region, and the flexible connection region is configured to divert the first chamber and the second chamber of the airbag along an object in any spatial direction when the airbag engages the object during deployment in the footwell so that the airbag is displaced to a position corresponding to a location of the object when set in the deployed state,
   wherein the flexible connection region comprises:
      a first separation seam extending from a first end of the flexible connection region to a first overflow opening, the first overflow opening being formed through the first separation seam at a second end of the flexible connection region, the second end being opposite to the first end of the flexible connection region,
      a second separation seam extending from the second end of the flexible connection region to a second overflow opening, the second overflow opening being formed through the second separation seam at the first end of the flexible connection region, and
      an overflow channel defined between the first separation seam and the second separation seam.

2. The leg protection device according to claim 1, wherein the object in the footwell includes a leg or a foot of the occupant.

3. The leg protection device according to claim 1, wherein the first and second chambers each have a ventilation hole.

4. The leg protection device according to claim 1, wherein the first and second chambers have identical shapes and receiving volumes.

5. The leg protection device according to claim 1, wherein the first and second chambers have different shapes and receiving volumes.

6. An occupant protection system for a vehicle comprising:
    a vehicle seat configured to move in a longitudinal direction from a normal position to a comfort position, wherein in the comfort position, the vehicle seat is displaced further away from a steering wheel of the vehicle in the longitudinal direction;
    a steering wheel airbag disposed in the steering wheel of the vehicle;
    a leg protection device comprising:
        an airbag module comprising a panel airbag and a gas generator configured to inflate the panel airbag to a deployed state, wherein the panel airbag is disposed in a footwell of the vehicle and in front of the vehicle seat when set in the deployed state,
        wherein the panel airbag comprises a first chamber and a second chamber fluidically connected to the first chamber, and the first chamber and the second chamber are each configured to be deployed in the footwell to protect an occupant of the vehicle when the panel airbag is set in the deployed state,
        wherein the first chamber is connected to the second chamber by a flexible connection region, and the flexible connection region is configured to divert the first chamber and the second chamber of the panel airbag along an object in any spatial direction when the panel airbag engages the object during deployment in the footwell so that the panel airbag is displaced to a position corresponding to a location of the object when set in the deployed state; and
    a crash sensor system configured to detect an impending vehicle impact or an occurrence of a vehicle impact,
    wherein if the vehicle seat is set in the normal position and the crash sensor system detects the impending vehicle impact or the occurrence of the vehicle impact, the leg protection device is configured to actuate the panel airbag in the deployed state and the steering wheel airbag is configured to be actuated in the deployed state,
    wherein if the vehicle seat is set in the comfort position and the crash sensor system detects the impending vehicle impact or the occurrence of the vehicle impact, the leg protection device is configured to actuate the panel airbag in the deployed state and the steering wheel airbag is configured not to be actuated in the deployed state.

7. The occupant protection system of the vehicle according to claim 6, wherein the airbag module of the leg protection device is disposed in a lower region of an instrument panel of the vehicle.

* * * * *